United States Patent
Kraipak et al.

(10) Patent No.: US 8,786,449 B1
(45) Date of Patent: Jul. 22, 2014

(54) SYSTEM-ON-CHIP WITH THERMAL MANAGEMENT CORE

(75) Inventors: Waseem Saify Kraipak, Maharashtra (IN); George Bendak, San Diego, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 1201 days.

(21) Appl. No.: 12/687,817

(22) Filed: Jan. 14, 2010

Related U.S. Application Data (63) Continuation-in-part of application No. 12/639,064, filed on Dec. 16, 2009.

(51) Int. Cl.
*G08B 17/00* (2006.01)

(52) U.S. Cl.
USPC ...... 340/584; 340/506; 340/539.26; 374/163; 702/99; 702/130; 702/132; 365/185.15; 365/222

(58) Field of Classification Search
USPC ........ 340/584, 506, 539.26; 361/103; 702/99, 702/130, 132; 331/66; 374/163; 365/185.15, 222, 201, 200, 212, 211, 365/196
See application file for complete search history.

(56) References Cited

U.S. PATENT DOCUMENTS

| | | | |
|---|---|---|---|
| 5,828,619 A * | 10/1998 | Hirano et al. | 365/222 |
| 6,545,921 B2 * | 4/2003 | Ohtani et al. | 365/201 |
| 7,324,398 B2 * | 1/2008 | Shim et al. | 365/212 |
| 7,436,727 B2 * | 10/2008 | Jain et al. | 365/222 |
| 7,451,348 B2 * | 11/2008 | Pecone et al. | 714/14 |
| 7,548,478 B2 * | 6/2009 | Lee | 365/222 |
| 7,583,553 B2 * | 9/2009 | Mori | 365/222 |
| 7,761,191 B1 * | 7/2010 | Wagner | 700/299 |
| 8,228,736 B2 * | 7/2012 | Joo et al. | 365/185.15 |
| 2002/0140389 A1 * | 10/2002 | Ohki et al. | 318/471 |
| 2006/0034343 A1 * | 2/2006 | Rotem | 374/45 |
| 2006/0161373 A1 * | 7/2006 | Mangrulkar et al. | 702/130 |
| 2008/0123238 A1 * | 5/2008 | Campos et al. | 361/103 |
| 2009/0021314 A1 * | 1/2009 | Boerstler et al. | 331/66 |
| 2009/0190427 A1 * | 7/2009 | Brittain et al. | 365/212 |
| 2010/0142291 A1 * | 6/2010 | Joo et al. | 365/189.15 |
| 2010/0169585 A1 * | 7/2010 | Steinbrecher et al. | 711/154 |

* cited by examiner

*Primary Examiner* — Hoi Lau
(74) *Attorney, Agent, or Firm* — Amin, Turocy & Watson, LLP (57) ABSTRACT

A system and method are provided for using a thermal management core to control temperature on a system-on-chip (SoC). The method provides an SoC with an internal thermal management core and an internal temperature sensor. For example, the sensor may be located on or near a processor core die. The thermal management core monitors temperatures recorded by the SoC temperature sensor, and sends commands for controlling SoC device functions. In response to these commands, the thermal management core monitors a change in the temperature at SoC temperature sensor. The temperature sensor may be monitored via a dedicated SoC internal interface connecting the processor and the thermal management core. Alternately, the thermal management core may poll for temperatures via a system management bus (SMBUS) SoC external interface connecting the processor and thermal management core. Further, a dedicated SoC external alert interface connecting the processor and thermal management core may be monitored.

20 Claims, 8 Drawing Sheets

SYSTEM-ON-CHIP WITH THERMAL MANAGEMENT CORE

RELATED APPLICATIONS

This application is a Continuation-in-Part of a pending application entitled, SYSTEM-ON-CHIP WITH FEEDBACK LOOP FOR PROCESSOR FREQUENCY CONTROL, invented by Waseem Kraipak et al., Ser. No. 12/639,064, filed Dec. 16, 2009, which is incorporated herein by reference.

BACKGROUND OF THE INVENTION

1. Field of the Invention

This invention generally relates to system-on-chip (SoC) thermal management and, more particularly, to a system and method for using a hardware core and dedicated communication interfaces to monitor and control SoC thermal conditions.

2. Description of the Related Art

Figure 1:
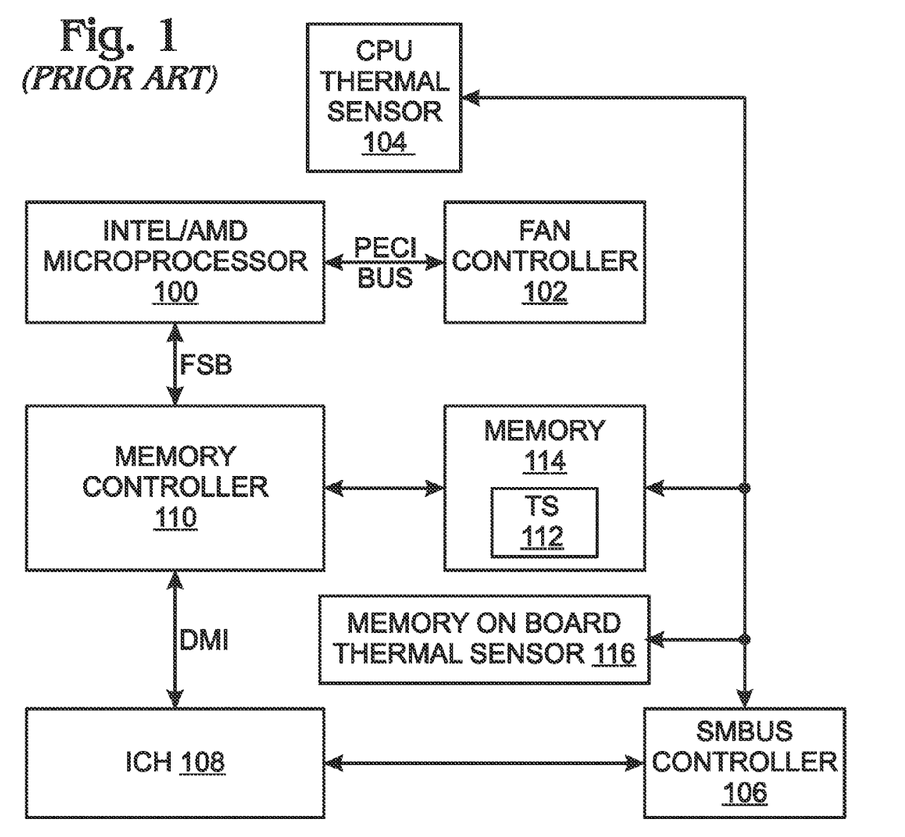
FIG. 1 is a schematic block diagram of a processor indirectly connected to temperature sensors (prior art).

FIG. 1 is a schematic block diagram of a processor indirectly connected to temperature sensors (prior art). Conventionally, a microprocessor 100 communicates directly with the fan controller 102 via the platform environment control interface (PECI) bus. However, the CPU sensor 104, whether mounted on or near the CPU 100, must relay its readings via the system management bus (SMBUS) and SMBUS controller 106, the I/O controller hub (ICH) or southbridge 108, the digital media interface (DMI), the memory controller (northbridge) 110, and the front side bus (FSB). Likewise, a sensor (TS) 112 mounted on the memory 114, or a sensor 116 mounted on the board near the memory takes the same indirect path. This indirect path requires communication between different subsystems, making the monitoring process relatively complex and slow. With respect to the processor 100, the temperature monitoring and fan control processes are managed by operating system (OS) software, again making these processes relatively complex and slow, as well as interrupting the processor from completing other tasks. The CPU temperature can also be regulated by controlling the processor operating frequency. Conventionally however, the frequency of operation is changed through manually intervention to modify the dc supply voltage or through a software mechanism. Manual intervention and software mechanisms are both relatively cumbersome.

It would be advantageous if thermal management in an SoC could be managed by an independent thermal management core (hardware block), instead of indirectly through software mechanisms.

SUMMARY OF THE INVENTION

Disclosed herein are a system and method of using a thermal management hardware core to continuously monitor a processor core die temperature, system-on-chip (SoC) ambient temperature, memory temperature, and memory ambient temperature. When the thermal management core detects any of the temperatures (ambient or die) crossing a threshold value, it sends a command to a particular core (processor or memory controller) to take an action to cool the processor core or memory, as well communicating to a fan control device to regulate the speed of the fan. The fan need not run all the time, as it may only be turned on whenever the processor core temperature crosses the threshold value. Minimal use of the fan reduces noise generation and saves power.

The thermal management core can monitor the temperature of individual cores without impacting the performance of the system and can modify memory and processor performance parameters independently, so that the peak possible performance can be obtained for any temperature scenario. Advantageously, the thermal management core provides a single point of control for an entire SOC board. A single bus (SMBUS) may be used to monitor all the temperature sensors and for communication between the blocks.

Accordingly, a method is provided for using a thermal management core to control temperature on a system-on-chip (SoC). The method provides an SoC with an internal thermal management core and an internal temperature sensor. For example, the sensor may be located on or near a processor core die. The thermal management core monitors temperatures recorded by the SoC temperature sensor, and sends commands for controlling SoC device functions. In response to these commands, the thermal management core monitors a change in the temperature at SoC temperature sensor. The temperature sensor may be monitored via a dedicated SoC internal interface connecting the processor and the thermal management core. Alternately, the thermal management core may poll for temperatures via a system management bus (SMBUS) SoC external interface connecting the processor and thermal management core. Further, a dedicated SoC external alert interface connecting the processor and thermal management core may be monitored.

Likewise, the thermal management core may send commands for controlling SoC device functions via either the dedicated internal interface or SMBUS. If the SoC includes a memory management core connected to the dedicated SoC internal interface, then the thermal management core can send commands to the processor changing the processor operating frequency, or send commands to the memory management core changing memory operating frequency.

Additional details of the above-described method, and a SoC with a thermal management core for controlling temperature, are provided below.

DETAILED DESCRIPTION

Figure 2:
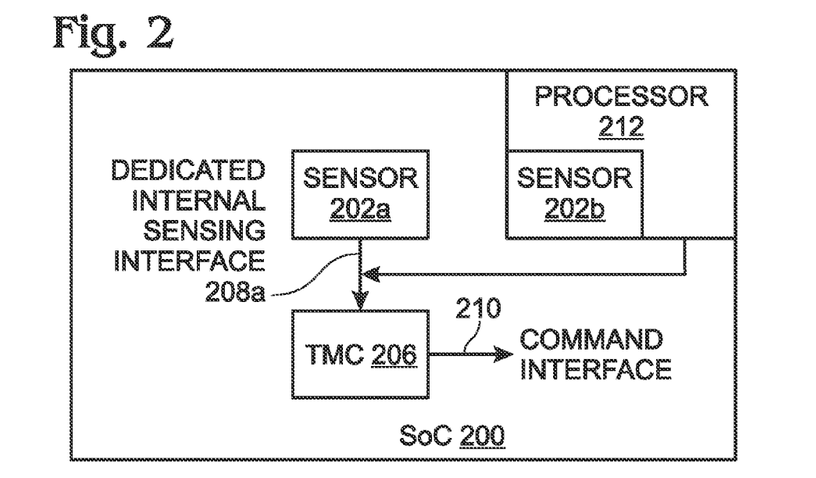
FIG. 2 is a schematic block diagram of a system-on-chip (SoC) with a thermal management core for controlling temperature.

FIG. 2 is a schematic block diagram of a system-on-chip (SoC) with a thermal management core for controlling temperature. The SoC 200 comprises a temperature sensor 202 having an interface to supply temperature readings. A thermal management core (TMC) 206 has a sensing interface on line 208 for monitoring temperatures recorded by the SoC temperature sensor. The TMC 206 has a command interface on line 210 for sending commands to control SoC device functions. In some aspects of the SoC, as explained in more detail below, the sensing interface and command interface may be the same. The temperature sensor 202 reads changes in temperature in response to the commands sent by the thermal management core 206.

Typically, the SoC 200 includes a processor 212, which may also be referred to as a microprocessor or central processing unit (CPU). The processor 212 executes instructions received on the data/address bus (not shown) at an operating frequency responsive to the voltage level on the supply voltage interface (not shown). In one aspect, the temperature sensor 202a is physically mounted in a location near the processor 212. Alternately, the sensor 202b is co-located with the processor, with an electrical interface connected to the processor. Thus, the sensor 202b is monitored through communications with the processor 212. More explicitly, the thermal management core sensing interface 208a shown in FIG. 2 is a dedicated SoC internal interface connected to the processor 212. In this aspect, the sensing interface 208 is also the command interface 210.

Figure 3:
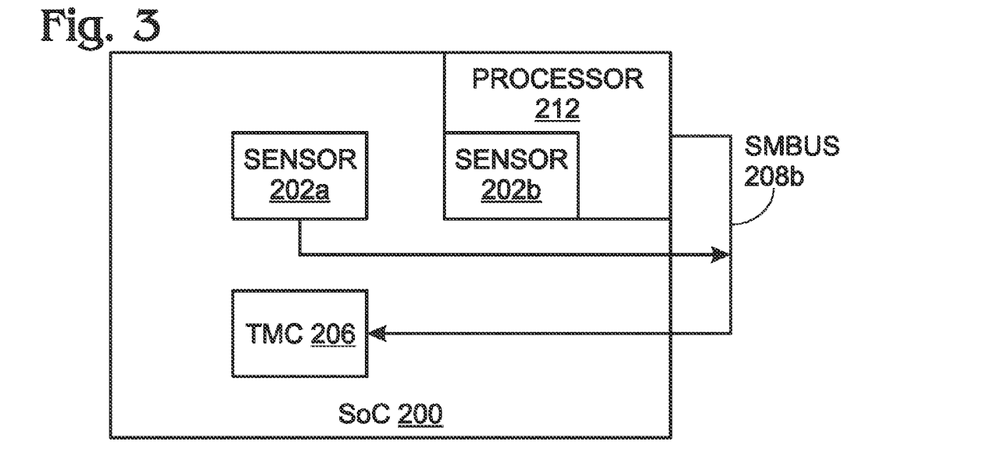
FIG. 3 is a schematic block diagram depicting a first variation of the SoC of FIG. 2.

FIG. 3 is a schematic block diagram depicting a first variation of the SoC of FIG. 2. In this aspect, the TMC sensing interface 208b is a system management bus (SMBUS) SoC external interface connected to the processor for polling temperatures. Note: the SMBUS is typically used for other functions besides reading temperature values and sending temperature control commands. Although an SMBUS is specifically shown, any low speed serial communication bus, such as inter-integrated circuit ($I^2C$ or I2C), would also enable the TMC sensing interface.

Figure 4:
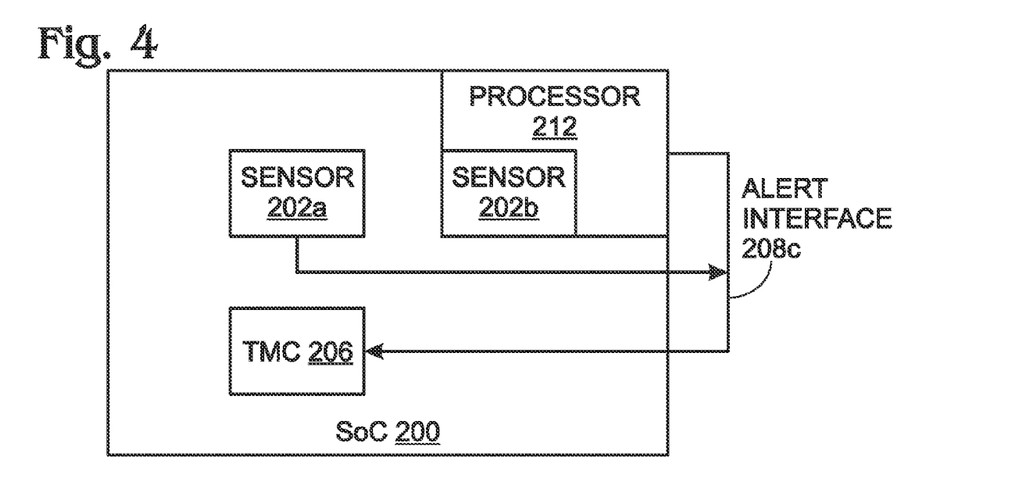
FIG. 4 is a schematic block diagram depicting a second variation of the SoC of FIG. 2.

FIG. 4 is a schematic block diagram depicting a second variation of the SoC of FIG. 2. In this aspect, the TMC sensing interface 208c is a dedicated SoC external alert interface connected to the processor 212 for monitoring alerts. Note: the alert interface 210c is dedicated exclusively to temperature monitoring.

Figure 5:
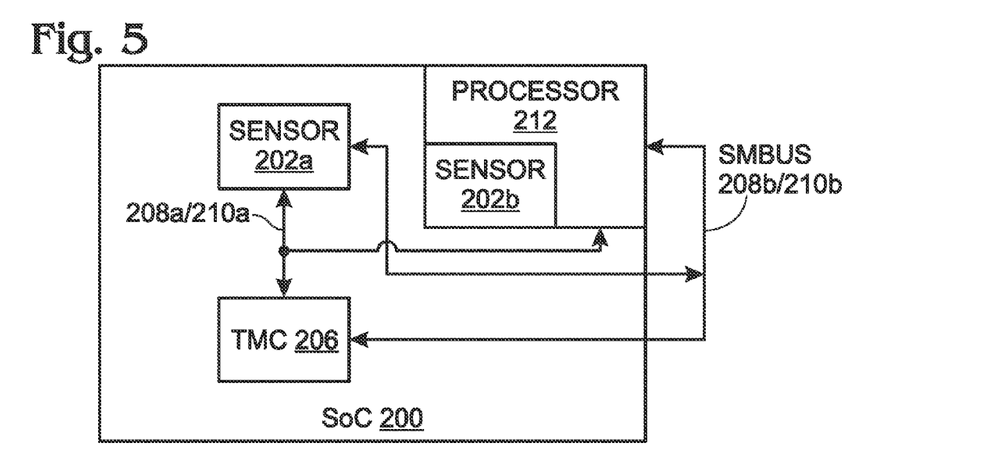
FIG. 5 is a schematic block diagram depicting a third variation of the SoC of FIG. 2.

FIG. 5 is a schematic block diagram depicting a third variation of the SoC of FIG. 2. In this aspect, the thermal management core command interface is either the dedicated SoC internal interface connected to the processor on line 208a/210a, or the SMBUS connected to the processor on line 208b/210b. Note: the SoC 200 need not necessary have both interfaces. Further, if the SoC has both interfaces, they may have different functions. For example, interface 208a/210a (208a) may be used as a sensing interface, while interface 208b/210b (210b) may be used as a command interface, or vice versa. Further, line 208a may be used as a sensing interface for some sensors, while line 208b is used as a sensing interface for other sensors. Likewise, line 210a may be used as a command interface to some SoC elements, while line 210b is used as a command interface to other SoC elements.

Figure 6:
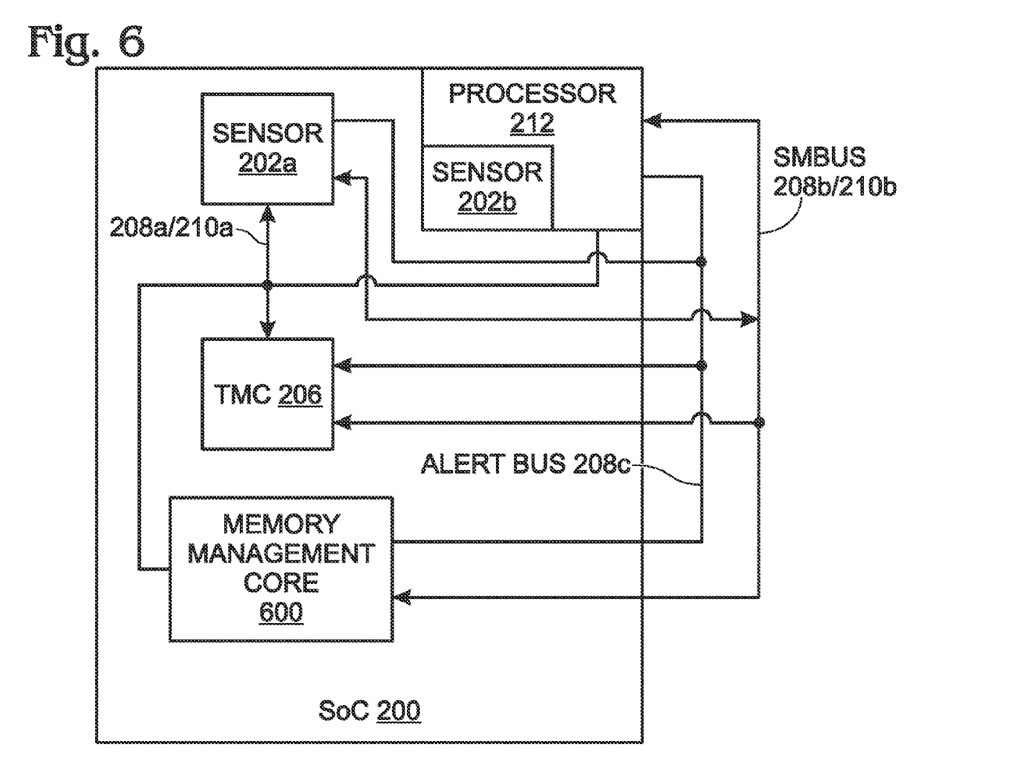
FIG. 6 is a schematic block diagram depicting a variation of the SoC of FIG. 5.

FIG. 6 is a schematic block diagram depicting a variation of the SoC of FIG. 5. In this aspect the SoC 200 includes a memory management core 600 connected to the dedicated SoC internal interface 208a. In response the temperature measurements received via one of the sensing interfaces (208a, 208b, or 208c), the thermal management core command interface 210a or 210b may be used to send commands to the processor 212 for changing the processor operating frequency, for sending commands to the memory management core 600 for changing memory operating frequency, or both.

Figure 7:
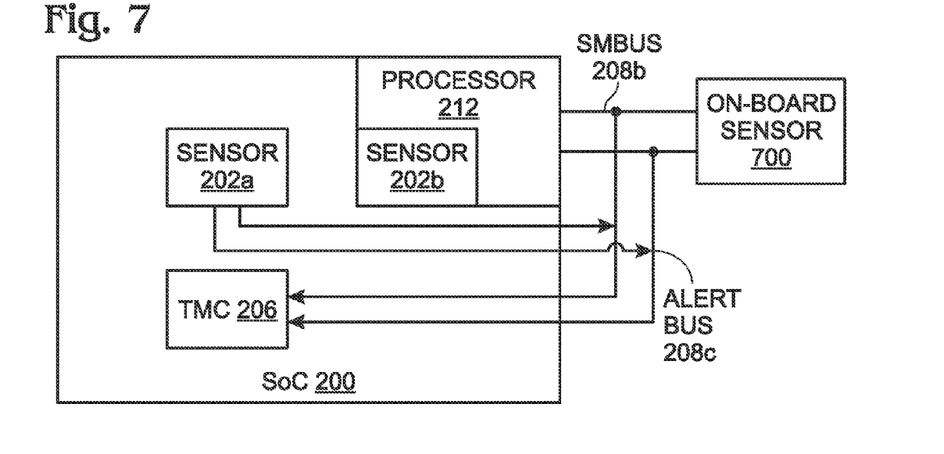
FIG. 7 is a schematic block diagram depicting a fourth variation of the SoC of FIG. 2.

FIG. 7 is a schematic block diagram depicting a fourth variation of the SoC of FIG. 2. In this aspect a temperature sensor 700 is mounted on a circuit board adjacent to the SoC. Alternately but not shown, the sensor 700 may be located adjacent memory device (see FIG. 8), or some other component mounted on a board with the SoC. The thermal management core 206 monitors the board-mounted temperature sensor 700 by polling for temperatures via the SMBUS 208b connecting the board-mounted temperature sensor and thermal management core, or by monitoring the dedicated SoC external alert interface 208c connecting the board-mounted sensor and thermal management core. Again, it should be remembered that not every embodiment of the SoC includes both a SMBUS (as used for temperature monitoring) and a dedicated alert interface.

Figure 8:
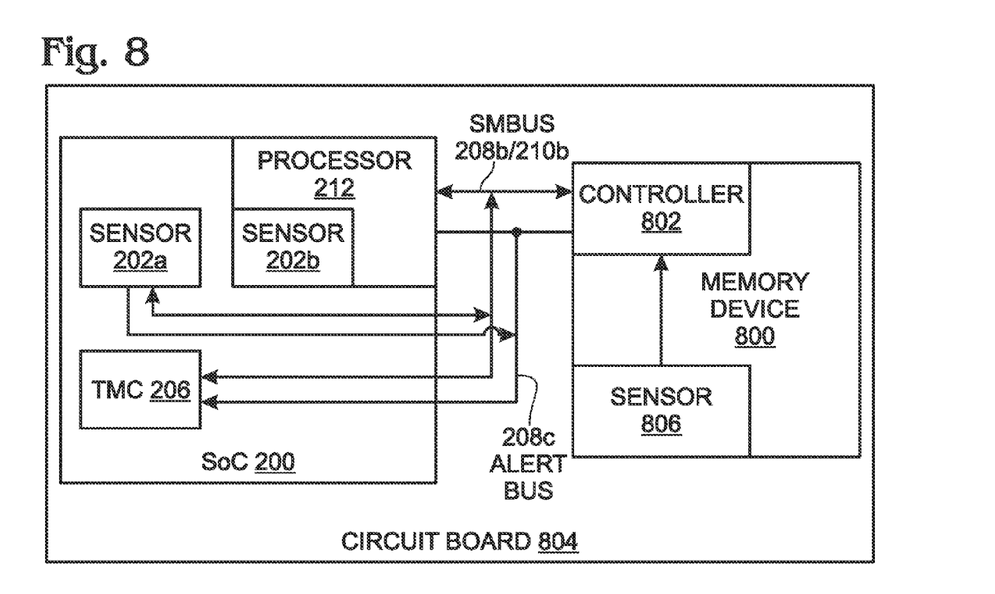
FIG. 8 is a schematic block diagram depicting a fifth variation of the SoC of FIG. 2.

FIG. 8 is a schematic block diagram depicting a fifth variation of the SoC of FIG. 2. In this aspect, a memory device 800 with a controller 802 is mounted on a circuit board 804 adjacent to the SoC 200. The memory device 800 has a temperature sensor 806 physically mounted on the memory device, electrically connected to the memory device. The thermal management core 206 monitors the memory device temperature sensor by of polling for temperatures via the SMBUS on line 208b connecting the memory device 800 and thermal management core 206, or by monitoring the dedicated SoC external alert interface on line 208c connecting the memory device and thermal management core. The thermal management core 206 sends commands to the memory device controller 802 for changing memory operating frequency via the SMBUS 210b. As above, the board need not necessary include both a SMBUS, as used for temperature monitoring, and an alert interface. Alternately, the alert interface 208c may be used for monitoring while the SMBUS is used for commands.

Figure 9:
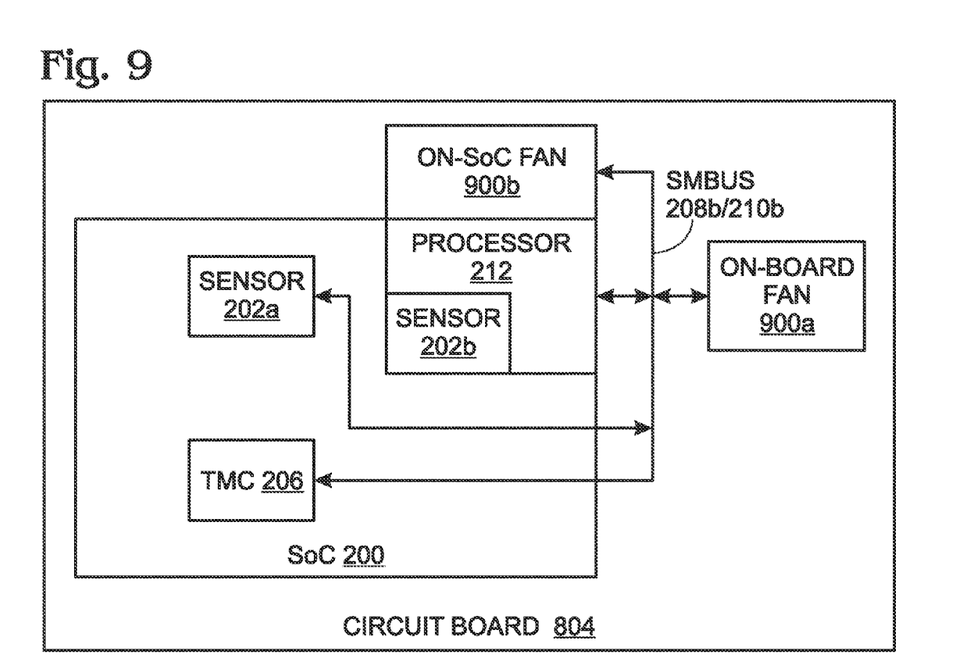
FIG. 9 is a schematic block diagram depicting a sixth variation of the SoC of FIG. 2.

FIG. 9 is a schematic block diagram depicting a sixth variation of the SoC of FIG. 2. In this aspect, a fan 900a is mounted on the circuit board 804 adjacent to the SoC 200. The thermal management core 206 sends commands to the board-mounted fan 900a via the SMBUS 210b connecting the board-mounted fan and thermal management core. Alternately or in addition to fan 900a, there may be a fan 900b mounted (directly) on the SoC 200. In that case, the thermal management core 206 would likewise send commands to the SoC-mounted fan via the SMBUS connecting the SoC-mounted fan and thermal management core.

With reference to any of the FIGS. 2 through 9, if the thermal management core 206 initially monitors a high temperature, and subsequently monitors an insufficient change in temperature at temperature sensors 202a, 202b, 700, or 806, in response to the commands on line 210, the TMC 206 may have the capability of sending commands to the processor 212 for discontinuing processor operations, to the memory management core 600 for discontinuing memory operations, or to both the processor and to the memory management core to discontinue their operations.

As used in this application, the terms "core" refers to an integrated circuit die of connected hardware sub-components that supply electrical signals in response to electrical signal stimuli. While these electrical signals may be indirectly affected by software operations performed external to die, there is no processor or software application internal to the die generating electrical signals. Any logic functions performed internal to the core are the result of a hardware based state machine type logic.

Figure 10:
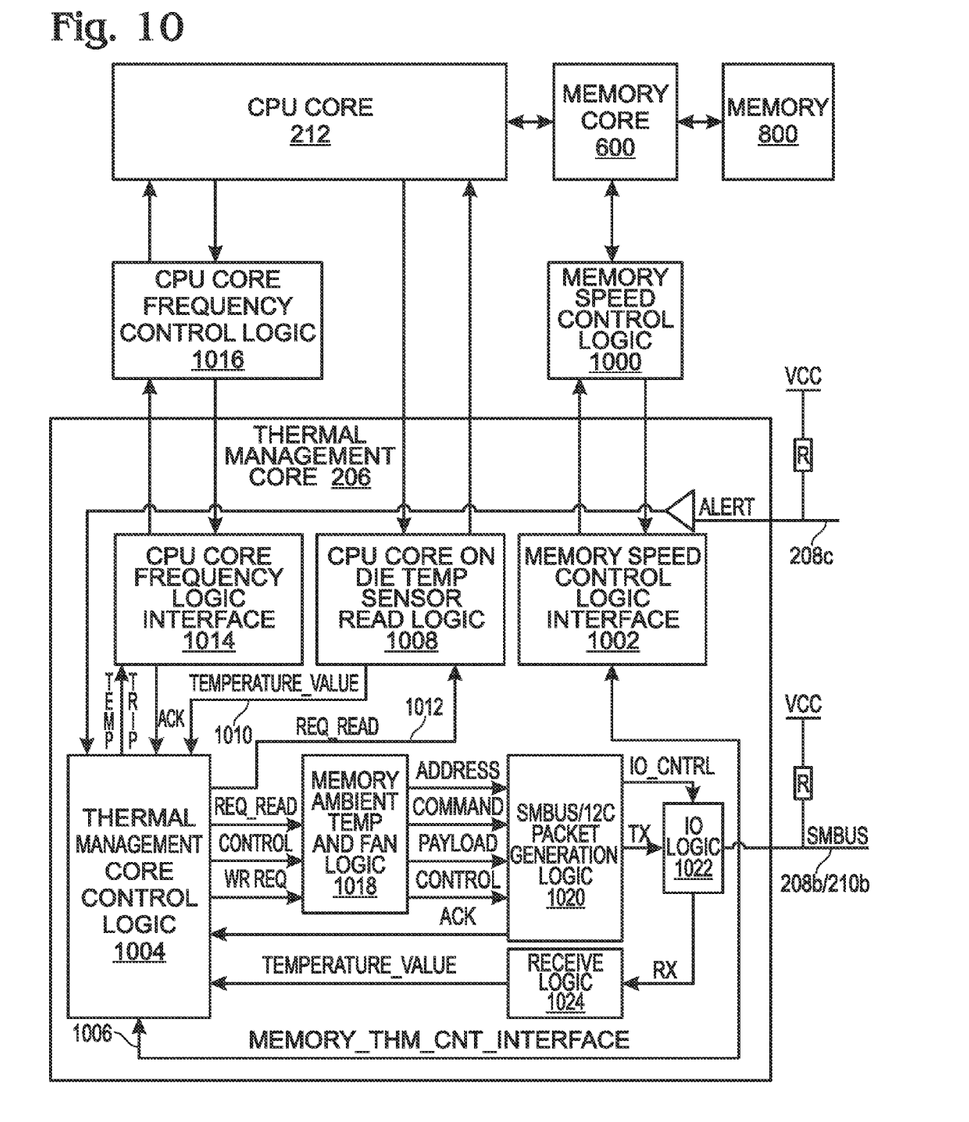
FIG. 10 is a detailed schematic block diagram of the thermal management core of FIG. 2.

FIG. 10 is a detailed schematic block diagram of the thermal management core of FIG. 2. The TMC core 206 is connected to the memory speed control logic 1000 through a memory control logic interface 1002. The thermal management core control logic 1004 communicates to the memory speed control logic 1002 through the MEMORY_THM_CNT_INTERFACE bus 1006. The thermal management core control logic 1004 can send a command to the memory speed control interface 1002 instructing the memory speed control logic 1000 to change the memory operational speed either up or down.

The CPU core on die temp sensor read logic 1008 is used to read the on-die CPU temperature and send this temperature information to the thermal management core control logic 1004 on line 1010. The thermal management core logic 1004 initiates a read request on Req_Read bus 1012. When the CPU core on die temp logic 1008 receives this read request, it responds back to the thermal management core logic 1004 with a die temperature value.

The CPU core frequency logic interface 1014 is connected to the CPU core frequency control logic 1016 whenever the thermal management core logic 1004 receives a report of the CPU die temperature exceeding a threshold value. A command is sent to the CPU core frequency logic 1016 directing that the CPU frequency and voltage be reduced, so that CPU die temperature can be brought down instantly. If the die temperature is within limits, the CPU core frequency logic 1016 is directed to put the CPU core back to a normal operating frequency.

Memory ambient temperature and fan control logic 1018 is connected between the thermal management core logic 1014 and SMBUS/I²C packet generation logic 1020. The memory ambient temperature and fan control logic 1020 sends address, command, payload, and control signals to the SMBUS/I²C packet generation logic 1020. This logic unit (1020) makes the required packet for SMBUS or I²C communications and sends the bits serially out on the IO logic 1022. Receive logic 1024 is connected with IO logic 1022 to accept receive data from the SMBUS.

Functional Description

Described above is a thermal management core capable of monitoring the CPU core die temperature, the ambient temperature of the SoC on which the CPU is embedded, memory device temperature, and the ambient temperature near the SoC or memory device. The thermal management is able to directly communicate to the memory controller and fans.

Figure 11:
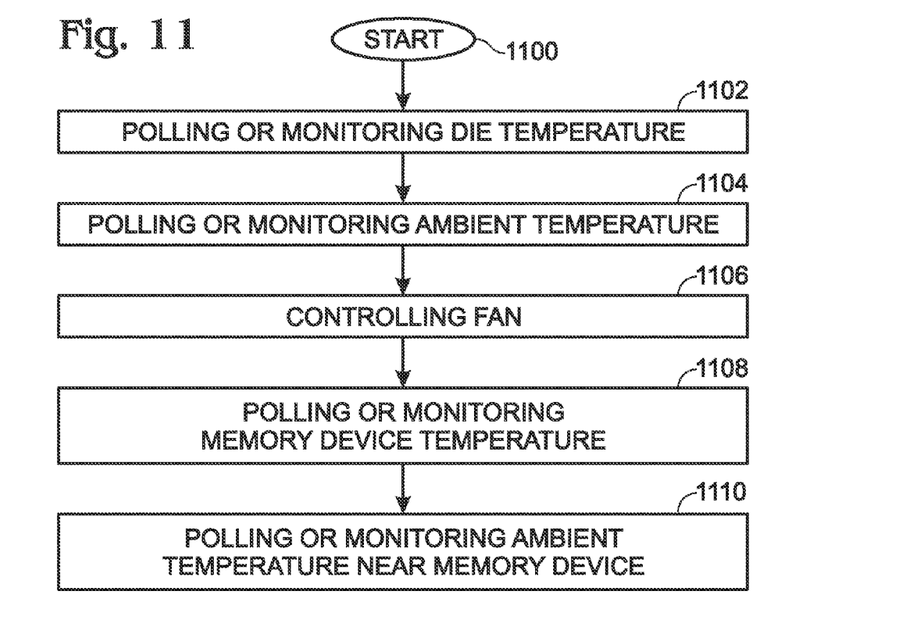
FIG. 11 is a simple flowchart illustrating exemplary operations of the thermal management core.

FIG. 11 is a simple flowchart illustrating exemplary operations of the thermal management core. The method starts at Step 1100. In Step 1102 the thermal management core communicates on the SMBUS to the temperature sensor on the processor core, or in the SoC near the processor. The thermal management may send a Read command on the SMBUS to read the die temperature of the CPU core die. The thermal management core can co-located in the same die as the CPU, in a different die in the same SoC (as shown in FIG. 2), or it can be a separate chip on the board. Alternately, the thermal management core monitors the alert bus.

In Step 1104 the thermal management core may communicate via the SMBUS to a PC board thermal sensor placed near the SoC chip to determine the ambient temperature around the SoC. The thermal management core may send a Read command on the SMBUS to read the ambient temperature near the SOC, or monitor a dedicated alert interface connected to this sensor.

In Step 1106 the thermal management core may communicate on the SMBUS to the fan control unit. For example, this unit may control the speed of the fan used to cool an SoC heat sink. The thermal management core may send a write command on the SMBUS to instruct the fan control unit to change the speed of the fan or shut down the fan.

In Step 1108 the thermal management core may communicate on the SMBUS to a thermal sensor mounted on the memory device. The thermal management core may send a Read command on the SMBUS to read the digital temperature of this sensor, or monitor a dedicated alert interface connected to this sensor.

In Step 1110 the thermal management core may communicate on the SMBUS to an on-board thermal sensor placed near the memory device to determine the ambient temperature adjacent the memory device. The thermal management core may send a Read command on the SMBUS to determine the ambient temperature of the memory slots, or monitor a dedicated alert interface connected to this sensor. It should be noted that the above-described steps are not order dependent.

Scenario 1: The Processor Core Die Temperature Crosses a Threshold Value.

The thermal management core can be configured in a polling mode where it continually polls each device connected to it. Alternately, an alert signal is used. Whenever this alert signal is asserted by any of the slave devices (on-die or on-board thermal sensors), the thermal management core may start reading (polling) the temperature of the thermal sensors.

For example, an alert is asserted by the CPU core indicating a temperature rise in the core. The thermal management core sends a Read command on the SMBUS to the CPU core to read the on-die temperature sensor. The CPU core responds by sending an 8-bit digital signal representing the temperature to the thermal management core. The thermal management core compares the read value with the stored threshold values stored in a register. Depending upon the die temperature, a command is issued on the SMBUS writing a bit pattern to the fan control unit. After the fan control unit has received the pattern, it turns on the fan and sets the desired fan speed, cooling the die.

Alternately, if there is no on-CPU sensor, the thermal management core sends a Read command on the SMBUS to read the ambient temperature of the SoC near the CPU core. An on-board SoC thermal sensor responds by sending an 8-bit digital signal representing temperature to the thermal management core. The thermal management core compares the read value with the stored threshold values for SoC ambient temperature stored in the registers. Depending upon the ambient temperature, a command on the SMBUS writes a bit pattern to the fan control unit. After the fan control unit has received the pattern, it turns on the fan and sets the desired fan speed.

Parallelly, the thermal management core may send a command to CPU core to lower the operating frequency. In one aspect, the process may be enabled by a frequency control logic unit or controller, as explained in detail in parent application Ser. No. 12/639,064, which is incorporated herein by reference. The frequency controller is able to lower the operating frequency of the core and change the voltage being supplied to the CPU core.

The thermal management core continues to monitor the temperatures until the die temperature/ambient temperatures return to their normal acceptable values. At this point the thermal management core instructs the CPU core to return to normal operation (increasing the supply voltage and operating frequency), and instructs the fan control logic to stop the fan gradually.

Scenario 2: Memory Device Temperature Crosses a Threshold Value.

The thermal management core reads the memory device on-die temperature sensor and on-board ambient temperature sensor located adjacent to the memory device. If the on-die value crosses the threshold value, the thermal management core sends a command to the memory device controller to perform a memory device thermal management function. For example, the memory device controller can place the memory device in self-refresh mode and stop receiving any further commands from the CPU core. Alternately, the memory device controller can change the operating speed of the memory device.

The thermal management core monitors the temperature and once the memory device temperature has been reduced, it instructs the memory device controller to switch the memory device speed back to normal.

Figure 12:
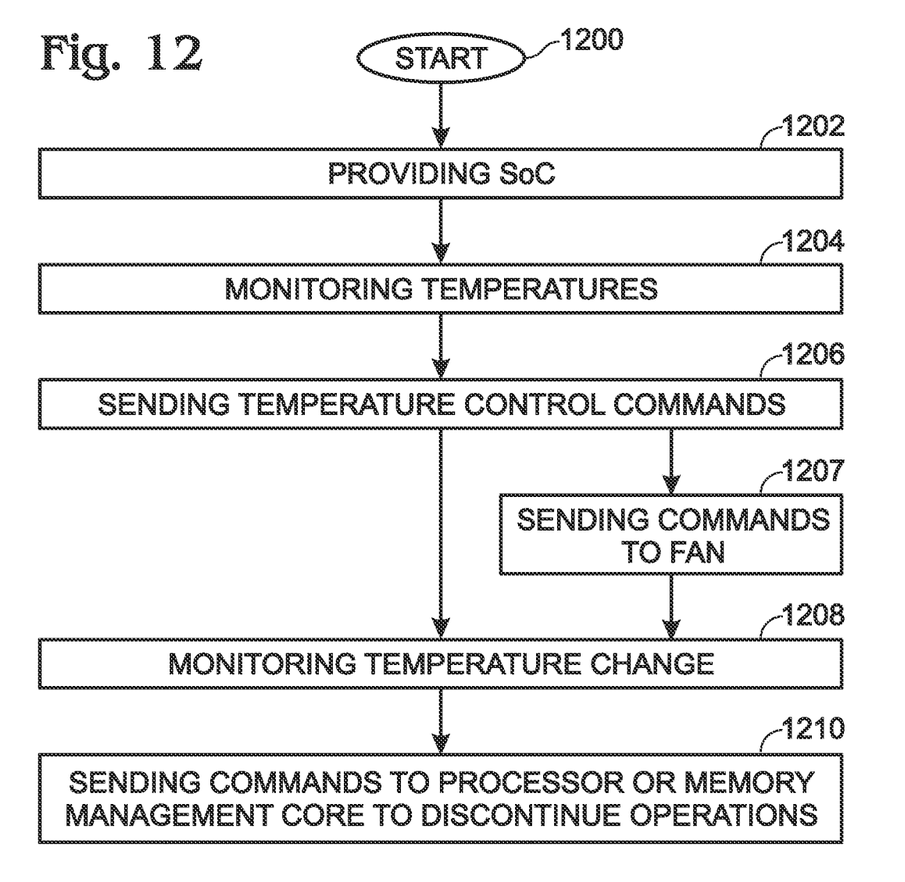
FIG. 12 is a flowchart illustrating a method for using a thermal management core to control temperature on an SoC.

FIG. 12 is a flowchart illustrating a method for using a thermal management core to control temperature on an SoC. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1200.

Step 1202 provides an SoC with an internal thermal management core and an internal temperature sensor. In Step 1204 the thermal management core monitors temperatures recorded by the SoC temperature sensor. In Step 1206 the thermal management core sends commands for controlling SoC device functions. Step 1208 monitors a change in the temperature at SoC temperature sensor in response to the commands.

In one aspect, providing the SoC in Step 1202 includes providing an SoC with a processor. The SoC temperature sensor can be mounted in a location near the processor or co-located with the processor, with an electrical interface connected to the processor. Then, monitoring temperatures recorded by the SoC temperature sensor in Step 1204 includes monitoring temperature via a dedicated SoC internal interface connecting the processor and the thermal management core, polling for temperatures via a system management bus (SMBUS) SoC external interface connecting the processor and thermal management core, or monitoring a dedicated SoC external alert interface connecting the processor and thermal management core. As noted above, the SoC need not necessarily include all these interfaces, or if included, the interface need not necessarily be used for monitoring temperature.

In another aspect, sending commands for controlling SoC device functions in Step 1206 includes sending commands via the dedicated SoC internal interface connecting the processor and thermal management core, or the SMBUS connected the processor and thermal management core. As noted above, the SoC need not necessarily include all these interfaces, or if included, the interface need not necessarily be used for sending temperature control commands.

In one aspect, providing the SoC in Step 1202 includes providing an SoC with a memory management core connected to the dedicated SoC internal interface. Then, sending commands for controlling SoC device functions in Step 1206 may include sending commands to the processor changing the processor operating frequency, sending commands to the memory management core changing memory operating frequency, or both.

In one aspect, providing the SoC in Step 1202 includes providing an SoC mounted on a circuit board with a board-mounted temperature sensor. Then, monitoring temperatures in Step 1204 includes monitoring the board-mounted temperature sensor by polling for temperatures via the SMBUS connecting the board-mounted temperature sensor and thermal management core, or monitoring the dedicated SoC external alert interface connecting the board-mounted sensor and thermal management core.

In another aspect, providing the SoC in Step 1202 includes providing an SoC mounted on a circuit board with a memory device, a memory controller, and a temperature sensor physically mounted on the memory device, electrically connected to the memory device. Then, monitoring temperatures in Step 1204 includes monitoring the memory device temperature sensor by polling for temperatures via the SMBUS connecting the memory device and thermal management core, or monitoring the dedicated SoC external alert interface connecting the memory device and thermal management core. Sending commands for controlling SoC device functions in Step 1206 then includes sending commands to the memory device controller for changing memory operating frequency via the SMBUS connecting the memory device and the thermal management core.

In another aspect, providing the SoC in Step 1202 includes providing an SoC with a fan mounted on the SoC or a fan mounted on a circuit board. Step 1207 sends commands to the board-mounted fan via the SMBUS connecting the fan and thermal management core. Monitoring a changing the temperature in Step 1208 includes changing the temperature in response to commands sent to the fan.

If Step 1204 monitors a high temperature, and Step 1208 monitors an insufficient change in temperature at the temperature sensor in response to the commands, Step 1210 sends commands to the processor for discontinuing processor operations, to the memory management core for discontinuing memory operations, or to both the processor and to the memory management core for discontinuing their operations.

Figure 13:
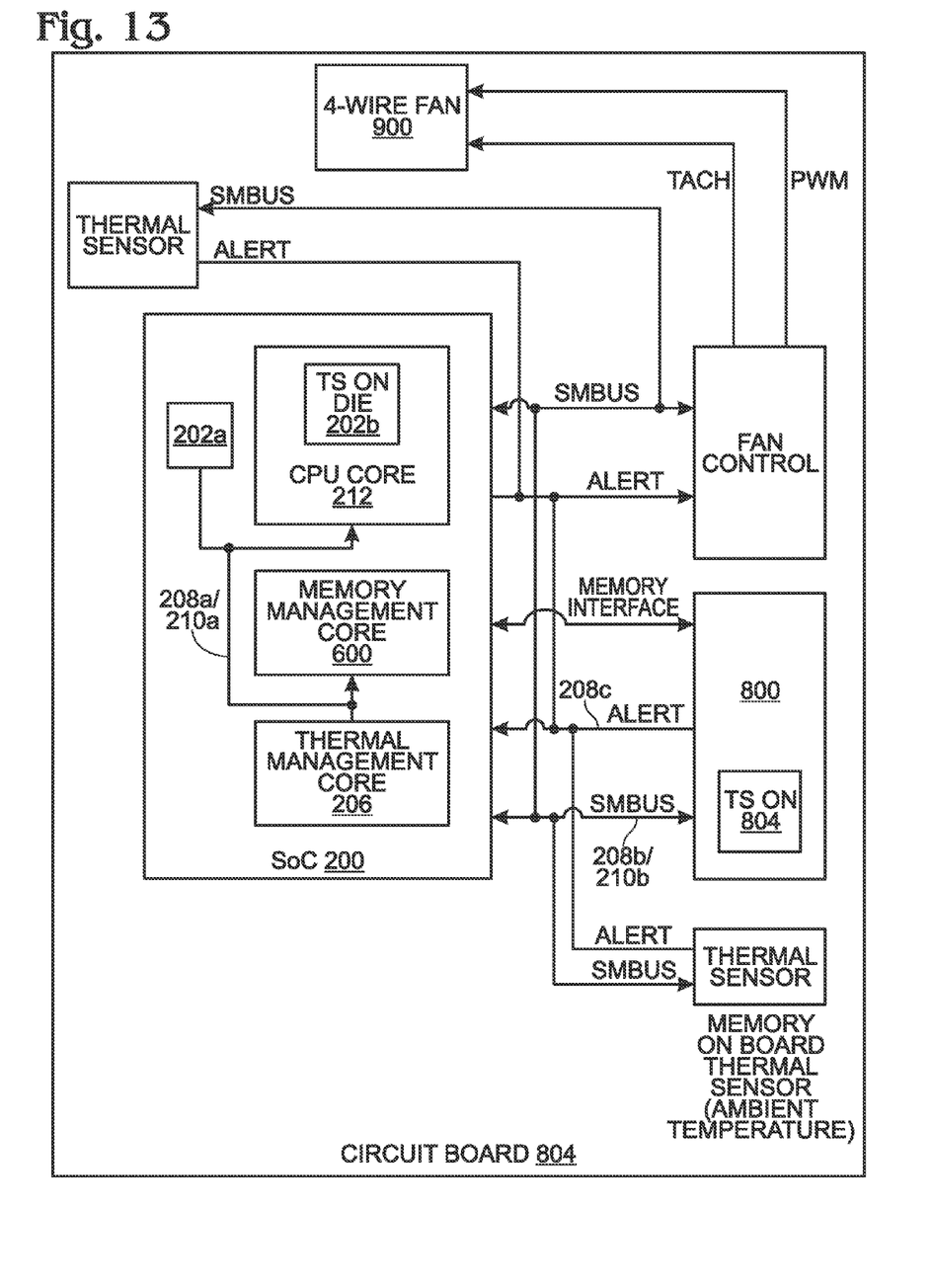
FIG. 13 is a schematic diagram depicting a combination of a number of elements, separately described in FIGS. 2-9.

FIG. 13 is a schematic diagram depicting a combination of a number of elements, separately described in FIGS. 2-9.

A system and method have been provided for using a thermal management core to control temperature in a SoC. Examples of particular message structures, processors, and hardware units have been presented to illustrate the invention. However, the invention is not limited to merely these examples. Other variations and embodiments of the invention will occur to those skilled in the art.

We claim:

1. A method for using a thermal management core to control temperature on a system-on-chip (SoC), comprising:
   monitoring, by a thermal management core, a first temperature measured by a first temperature sensor located on or near a processor of the SoC, and a second temperature measured by a second temperature sensor located on or near a memory device of the SoC; and
   sending, by the thermal management core, a first command that instructs a memory device controller of the SoC to change an operating frequency of the memory device based on at least one of the first temperature or the second temperature.

2. The method of claim 1, wherein monitoring the first temperature and the second temperature comprises at least one of monitoring via a dedicated SoC internal interface connecting the processor and the thermal management core, polling via a system management bus SoC external interface connecting the processor and thermal management core, or monitoring a dedicated SoC external alert interface connecting the processor and thermal management core.

3. The method of claim 2,
further comprising sending a second command to change an operating frequency of the processor.

4. The method of claim 3, wherein sending the second command comprises sending the second command via at least one of the dedicated SoC internal interface, or the system management bus.

5. The method of claim 2,
wherein monitoring the first temperature and the second temperature comprises monitoring at least one board-mounted temperature sensor of the SoC by at least one of polling via the system management bus, or monitoring the dedicated SoC external alert interface.

6. The method of claim 2,
wherein monitoring the second temperature comprises at least one of polling for the second temperature via the system management bus, or monitoring the dedicated SoC external alert interface; and
wherein sending the first command comprises sending the first command via the system management bus.

7. The method of claim 1,
further comprising:
in response to a determination that at least one of the first temperature or the second temperature satisfy a criterion, sending a second command, via a system management bus, to a board-mounted fan of a circuit board on which the SoC is mounted.

8. The method of claim 2, further comprising determining whether at least one of the first temperature or the second temperature satisfy a criterion after the sending the command.

9. The method of claim 8,
further comprising:
in response to a determination that at least one of the first temperature or the second temperature does not satisfy the criterion, sending a second command, via a system management bus, to a fan mounted on the SoC.

10. The method of claim 8,
further comprising:
in response to a determination that at least one of the first temperature or the second temperature does not satisfy a criterion in response to the command, sending a third command to at least one of discontinue a processor operation, or to discontinue a memory operation.

11. A system-on-chip (SoC) with a thermal management core for controlling temperature, the SoC comprising:
a first temperature sensor located on or near a processor of the SoC;
a second temperature sensor located on or near a memory device of the SoC; and
a thermal management core comprising a sensing interface configured to monitor a first temperature measured by the first temperature sensor and a second temperature measured by the second temperature sensor, and a command interface configured to send a first command that instructs a memory controller of the SoC to alter an operating frequency of the memory device in response to at least one of the first temperature or the second temperature satisfying a criterion.

12. The SoC of claim 11, wherein the sensing interface comprises at least one of a dedicated SoC internal interface connected to the processor, a system management bus SoC external interface connected to the processor configured to poll the first temperature, or a dedicated SoC external alert interface connected to the processor configured to monitor for an alert.

13. The SoC of claim 12, wherein the command interface comprises at least one of the dedicated SoC internal interface or the system management bus.

14. The SoC of claim 13,
wherein the thermal management core command interface is further configured to send a second command to change an operating frequency of the processor in response to at least one of the first temperature or the second temperature satisfying the criterion.

15. The SoC of claim 11, further comprising:
a board-mounted temperature sensor mounted on a circuit board adjacent to the SoC,
wherein the thermal management core is further configured to monitor the board-mounted temperature sensor by at least one of polling the board-mounted temperature sensor via a system management bus or monitoring a dedicated SoC external alert interface.

16. The SoC of claim 11,
wherein the thermal management core is further configured to monitor the first temperature sensor and the second temperature sensor by at least one of polling via a system management bus (SMBUS) or monitoring a dedicated SoC external alert interface.

17. The SoC of claim 11, further comprising:
a fan mounted on a circuit board adjacent to the SoC,
wherein the thermal management core is further configured to, in response to at least one of the first temperature or the second temperature satisfying the criterion, send a second command to the fan via a system management bus connecting the board-mounted fan and thermal management core.

18. The SoC of claim 11, further comprising:
a fan mounted on the SoC,
wherein the thermal management core is further configured to, in response to at least one of the first temperature or the second temperature satisfying the criterion, send a second command to the fan via a system management bus connecting the fan and the thermal management core.

19. The SoC of claim 11, wherein the thermal management core is further configured to determine whether at least one of the first temperature or the second temperature are within an allowable range after sending the first command.

20. The SoC of claim 19, wherein the thermal management core is further configured to, in response to a determination that the at least one of the first temperature or the second temperature does is not within the allowable range after sending the first command, send a subsequent command to at least one of discontinue a processor operation or discontinue a memory operation.

* * * * *